Oct. 15, 1957 H. P. SMITH 2,809,475
ROTARY TOOL HOLDING DEVICE
Filed March 25, 1954 2 Sheets-Sheet 1

INVENTOR
*Horace P. Smith*
BY *George Knowles*
ATTORNEY

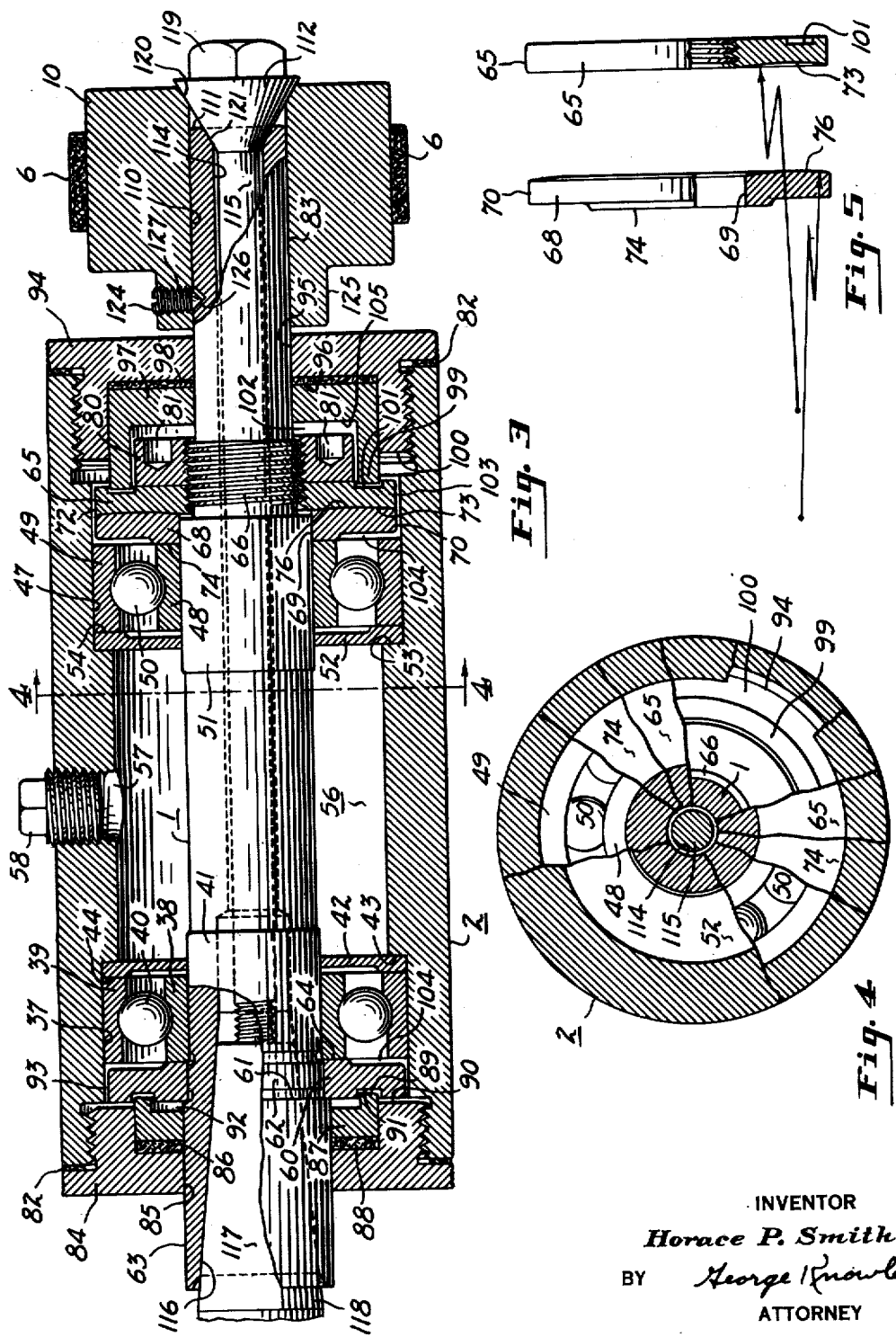

United States Patent Office 2,809,475
Patented Oct. 15, 1957

2,809,475

ROTARY TOOL HOLDING DEVICE

Horace P. Smith, Cheshire, Conn.

Application March 25, 1954, Serial No. 418,497

20 Claims. (Cl. 51—166)

This invention relates to rotary tool holders, more particularly to a high speed spindle device for use as an attachment on a conventional machine such as a lathe or miller. It is common practice to fit a rotary holder on a conventional lathe, miller or similar machine tool for the purpose of performing an operation such as grinding or burring. The range of such operations that can be performed and the particular types of cuts that can be made are limited by the physical structure or geometry of the rotary tool holding device and by the spindle speed that can be maintained without objectionable vibration.

The principal object of the present invention is to provide a generally improved device of the character mentioned which is of such design that its versatility and adaptability to various grinding, cutting and polishing operations is greatly enhanced.

Another objective is to provide such a device having an improved spindle arrangement which permits operation at extremely high speeds, especially with burrs and similar tools used internally of the work, without objectional vibrating or chattering, to obtain true cutting and adherence to close tolerances.

In the device of the present invention the spindle is mounted within a housing as by roller bearing assemblies spaced axially along the length of the spindle, the bearings being loaded to eliminate objectionable end play of the spindle in operation. The loading of the bearings is effected as by securing the inner or outer races against axial shifting and applying an axial force on the races not so held. In the preferred arrangement, shown in the drawings and described in greater detail hereinafter, the outer races of the bearings are held in predetermined spaced relation, as against internal shoulders in the housing, the inner races being relatively shiftable toward one another along the spindle over which they have a snug fit. Although both of the inner races may be shifted axially on the spindle, the best and most economical mode of practising the invention contemplates locating one of the inner races against a radial shoulder on the spindle and shifting the other of the inner bearing races as by a nut screw-threaded onto the spindle. By simple reversal of parts the inner races of the bearing assemblies may, of course, be located in fixed positions on the spindle, as by being abutted against radial shoulders, and the outer races, or one of them, may be shifted to apply equal and opposite axial loads to the bearings.

To apply an axial load to the bearing assemblies of a rotary tool holder of the high speed spindle type it is desirable to avoid any condition of unbalance and any condition of unequal loading of different roller elements, these being further objectives of the invention. By utilizing a circular disc shaped or washerlike nut to apply an axial load to the adjustable inner bearing race and by interposing a washer or circular disc between such disc-nut and the race an improved loading effect is obtained with better balance and more uniform loads on the circumferentially spaced roller elements of the bearing assembly.

As a refinement of this aspect of the invention the meeting faces of the nut-disc and the interposed washer-disc are preferably being made of highly finished, these elements preferably being made of an alloy steel capable of taking a high polish. As a still further refinement, these meeting faces of the axial loading washers are arcuately curved complementally. Such curving of the meeting faces is preferably toroidal, obtaining accurate centering of one disc on the other.

Another objective of the invention is concerned with lubrication, high speed spindles of the type with which we are concerned being subject to overheating with resultant bearing failure if the lubricant imposes a drag such as occurs when the ball bearing assemblies are packed with grease in the conventional manner. In the present arrangement advantage is taken of the characteristics of certain solid greases which result in so-called "bleeding" or yielding of relatively thin liquid lubricant oil. The present high speed spindle device provides a lubricant chamber between the bearing assemblies, such lubricant chamber preferably comprising an annular space surrounding the spindle and separated from each of the bearing assemblies by partition means which may take the form of circular discs carried by the housing and having close running fits with the spindle. Liquid oil "bleeding" from the solid lubricant in the central chamber migrates axially along the spindle through the running fit clearances in the partition means and thus reaches the housing chambers containing the bearing assemblies in condition to lubricate the rolling elements of the bearings without objectionable drag or heating. The high speed of the spindle may, in effect, produce a vaporizing of at least a portion of the liquid lubricant, the vapor permeating the bearing chamber and providing the desired character of lubricant for the balls or other roller elements of the bearings. In connection with the lubrication arrangement the present invention also provides improved oil and dust seals for the end openings of the housing in which the spindle is journaled, these being additional and more specialized objectives.

Another problem encountered in high speed spindle operation is concerned with pulley attachment. Because of the mass effects of a pulley it is essential that eccentricity be avoided to eliminate vibration. The rotary tool holder device of the present invention obtains accurate centering and retaining of the pulley on the spindle by a unique cone arrangement, the cone engaging both the spindle and the pulley. This centering of the pulley is another objective of the invention.

Other objects and advantages pertain to certain novel features of construction and combinations and arrangements of parts shown in the drawings, which constitute part of the specification, and set forth in the following detailed description of a spindle device which represents the preferred and best mode of practising the invention.

In the drawings:

Fig. 3 is a sectional view through the spindle housing taken axially of the spindle substantially along the line indicated at 3—3 of Fig. 2 and enlarged with respect to that figure;

Fig. 4 is a sectional detail taken transversely through the spindle housing substantially along the line indicated at 4—4 of Fig. 3 and with the various parts broken away in layers; and Fig. 5 is an elevational detail showing the disc-washer and the disc-nut in separated relation.

Figure 1:
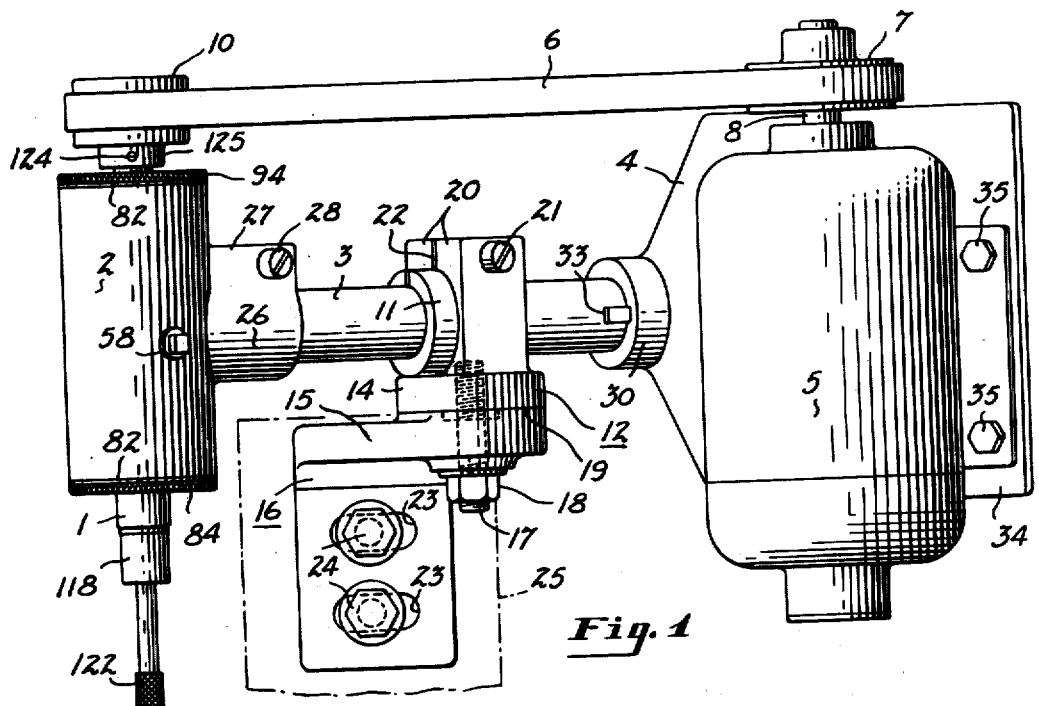
Figure 1 is a top or plan view of the high speed rotary spindle device representing the best and preferred mode of practising the present invention.
Figure 2:
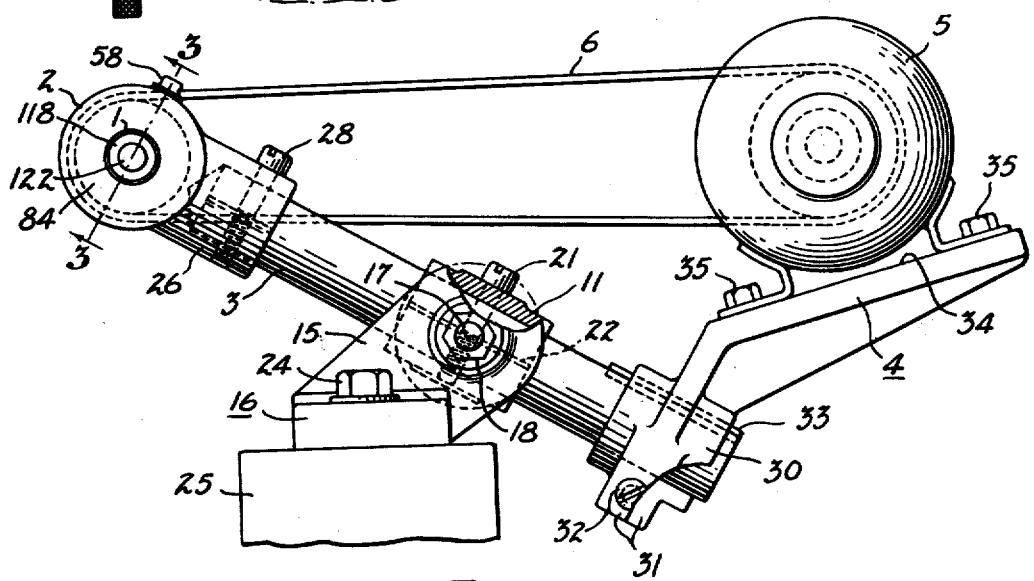
Fig. 2 is a side elevational view, partly in section and with parts broken away and removed, of the device of Fig. 1.

In the general arrangement of the present device a spindle 1 is journaled in a housing 2 secured in one end of a tilt bar or rod 3. The other end of the bar carries a bracket 4 on which is mounted a high speed electric motor 5 of conventional design. A flat, flexible belt 6 is trained around motor drive pulley 7 fast on motor shaft 8 and around driven pulley 10 fast on the spindle 1, these members serving to transmit rotational forces from the motor 5 to the spindle 1.

Intermediate its ends the tilt bar 3 is grasped in split end 11 of a support member or T bracket 12. This bracket is formed with a disclike circular base portion 14 disposed flatwise against a matching face on one side of upstanding portion 15 of an L-shaped pedestal bracket 16. A stud 17 screwed into the center of the circular base 14 of the T bracket 12 projects through a drill hole in the center of the matching face on the pedestal bracket. A clamping or locking nut 18 on the projecting end of the stud is tightened to draw the flat base of the T bracket 12 against the matching face of the pedestal bracket and thereby frictionally hold the T bracket with the tilt bar 3 in any desired position of angular adjustment about the tilt axis.

The end 11 of the T bracket 12 which grasps the tilt bar 3 is in the form of a tube the longitudinal axis of which is parallel to the meeting plane (indicated at 19) of the T bracket and the pedestal base. Integral ears 20 projecting laterally from the tubular end 11 of the T bracket are separated by a through slot 22 which is also continuous through the body of the tubular end 11. The ears receive a transverse clamping or tightening screw 21 by means of which the end 11 can be contracted about the tilt bar 3 to grip the latter. When the grip of the T bracket on the tilt bar 3 is relaxed by backing off the tightening screw 21 the tilt bar can be shifted axially in the T bracket to adjust the spindle 1 laterally. The tilt bar can also or in lieu of such axial sliding be rotated in the T bracket end so as to swing or turn the spindle 1 bodily about the longitudinal axis of the tilt bar.

The base portion of the L pedestal bracket 16 is at 90° to the flat face of the upstanding portion which receives the T bracket, the base being formed with one or more elongated slots or openings 23 to receive one or more cap screws 24 by means of which the spindle device is attached to the particular machine tool 25 on which it is to be used. It may, for example, be attached to the bed or overarm of a miller or to the bed compound or tool post of a lathe.

To mount the spindle housing 2 on the tilt bar end the housing, which is in the general form of a cylindrical open ended steel tube, is formed intermediate its ends with an integral laterally extending tubular boss 26. This boss is axially split along one side between integral ears 27. A clamping screw 28 is arranged to draw the ears together so as to clamp the tubular boss about the end of the tilt bar. The frictional grip of the boss on the bar resists relative turning and holds the spindle housing 2 in the desired position.

The motor bracket 4 is formed at one end with a split tubular portion 30 received clampingly about the tilt bar 3, this tubular portion having integral ears 31 on opposite sides of the split for receiving a tightening screw 32. A key 33 set into the bar and the sleeve resists turning of the bracket 4 on the tilt bar while permitting longitudinal adjustment as in regulating tension in the belt 6. The bracket 4 has a flat motor receiving surface 34 disposed in a plane which intersects the longitudinal axis of the tilt bar 3 in an acute angle, here about 35°. Cap screws 35 secure the base flanges of the motor 5 against the motor supporting surface 34 of the bracket, the screws being threaded into suitable holes tapped in the motor bracket. The housing 2 and the motor bracket 4 are oriented on the bar 3 so that the rotational axes of the spindle 1 and of the motor shaft 8 are parallel.

By means of the general arrangement of parts described the high speed spindle 1 can be adjusted to meet the requirements of a wide variety of burring and grinding operations. By loosening only the nut 18 which clamps the T bracket 12 against the pedestal bracket 16 the tilt bar 3 can be pivoted about the axis of the mounting stud 17. This mounting axis intersects the longitudinal axis of the tilt bar and, in most mounting arrangements, is disposed horizontally. Tilting of the bar 3 swings the spindle 1 laterally over an arcuate path and permits it to be advanced to and from the work without altering the angular relationship of the spindle axis to that of the work.

By loosening the clamping screw 21 the bar 3 may be slid axially in the T bracket 12, thereby shifting the spindle 1 laterally in a plane through the tilt axis of the bar 3 and the T bracket 12. Turning of the bar 3 in the sleeve portion 11 of the T bracket rotates the spindle about the longitudinal axis of the tilt bar. Other adjustments that can be accomplished are the bodily turning and shifting of the entire device by loosening the holding or clamping screws 24 to permit movement of the pedestal bracket 16 on the machine 25. The several adjustments described can be accomplished independently of one another, thus facilitating the setup operation required in fitting the present spindle device to a conventional machine tool.

In the arrangement employed for mounting the spindle 1 in the housing 2 a number of advantageous features are employed. The steel spindle is supported by a pair of spaced bearing assemblies to rotate about an axis extending through the open ends of the cylindrical housing 2, the spindle being coaxial to the circular sectioned housing. One of the bearing assemblies is located in a counterbore 37 at the tool end of the spindle and comprises inner and outer races 38 and 39, respectively, and a plurality of rolling elements or balls 40 between and spacing the races in the usual manner. The other or pulley end of the spindle is supported by a similar bearing assembly located in a counterbore 47 and comprising inner and outer races 48 and 49, respectively, a series of rotatable elements or balls 50 being interposed between the races. The contacting surfaces of the races and balls of the two bearing assemblies are hardened and polished in the usual manner customary with roller and ball bearings, it being satisfactory to employ standard bearing assemblies. Spacers or retainers for engaging and locating the balls or rolling elements of the bearings may be employed but are omitted from the drawings for clarity. The housing counterbores 37 and 47 into which the outer races of the bearing assemblies are pressed may be of the same diameter, and spindle portions 41 and 51 onto which the inner races 38 and 48, respectively, are pressed are of equal diameter.

Intermediate the axially spaced bearing assemblies the interior of the housing 2 constitutes an annular lubricant chamber 56 which surrounds the spindle. Access to the lubricant chamber is through a central opening 57 in the wall of the housing 2, this hole normally being closed by a screw plug 58.

At its ends the lubricant chamber 56 is defined by suitable radially disposed partition means here shown in the form of circular washers 42 and 52. The outer peripheries of the partition washers are held by the housing and their inner peripheries have close running fits with the axially spaced cylindrical portions 41 and 51 of the spindle. The clearances between the spindle and the inner peripheries of the partition washers or discs will vary, depending upon the particular application of the device and the lubricant employed. Clearances of from about .0003" to about .02" have been found to be satisfactory, the usual clearance being from about .001" to about .01", preferably of the order of about .005". It is through the annular clearances between the inner peripheries of the partition washers 42 and 52 and the rotating surface of the spindle that lubricant migrates from the chamber 56 into those portions of the housing interior which contain the bearing assemblies.

To obtain optimum operating conditions at high speeds of rotation the ball bearing assemblies are preferably lubricated by a very thin or light lubricant film such as results from atomizing or vaporizing of the lubricant. Such a result is obtained by packing the chamber 56 with a bleeding type grease, such as Texaco Regal Starfax No. 2. The liquid released at a slow rate by such a solid lubricant migrates axially along the spindle through the clearances provided between the spindle and the partitions or washer-discs 42 and 52 into the bearing assembly chambers. Rotation of the spindle, races and balls then effects distribution of the lubricant in the desired manner.

To secure the washer partitions 42 and 52 in the housing they are clamped between the outer races of the bearing assemblies and radial shoulders 43 and 53 at the ends of the counterbores 37 and 47, respectively. Light axial loading is applied to the inner races of the bearing assemblies which, transmitted through the balls or rolling elements 40 and 50, acts on the outer bearing races to hold the latter against the partition discs 42 and 52. Such axial load is applied to the inner races of the bearing assemblies by holding or locating one race, here the inner race 38 at the tool end of the spindle, against relative axial movement on the spindle and applying an axial force to the other of the inner bearing races, here the race 48 at the pulley end of the spindle, just sufficient to hold the parts snugly together. The inner race 38 is located in predetermined position on the cylindrical spindle portion 41 by engagement against a steel bearing retainer 60 which, in turn, is abutted against a radial shoulder 61 of the spindle. To facilitate assembly the bearing retainer 60, which has a cylindrical internal surface, is received about an axially short intermediate portion 62 of the spindle which is disposed between the smaller diameter bearing receiving portion 41 and larger diameter tool receiving end portion 63. Abutment of the retainer 60 against the shoulder 61 and of the inner bearing race 38 against the retainer 60 locates the latter in predetermined position on the spindle portion 41 and prevents relative movement of the bearing race on the spindle to the left as viewed in Fig. 3.

Axial force is applied to the inner bearing race 48 to move it to the left, relative to the spindle, as viewed in Fig. 3, by a nut-washer or disc 65 which is screwed onto a threaded portion 66 of the spindle adjacent to and of less diameter than the cylindrical spindle portion 51 on which is carried the inner bearing race 48. Interposed between the nut disc 65 and the inner race is a centering washer or disc 68 which bears axially against one end of the bearing race. The centering washer is formed with an internal cylindrical surface 69 that has a close sliding fit over the end of the cylindrical spindle portion 51 so as to be accurately centered on the spindle. Outer periphery 70 of the centering disc 68 is circular, being concentric to the rotational axis of the spindle and of such diameter that the disc periphery is located radially beyond the roller elements or balls 50 of the adjacent bearing assembly. The loading nut 65 also has a circular periphery 72 which, as shown, is also located radially beyond the bearing balls 50 and desirably is of approximately the same diameter as the centering disc 68.

To obtain a cooperative centering and aligning of the washer-discs 65 and 68 their contacting surfaces are arcuately and complementally curved, the curvature being symmetric about the rotational axis of the spindle. In the arrangement shown surface 73 of the nut disc 65 is concave. The curvature is arcuate, being toroidal in nature with a radius of curvature approximately twice that of the diameter of the circular path generated by the centers of the ball bearings 50. The locus of the center of curvature of the concave toroidal surface 73 is a circle on the cylindrical surface generated by the circular path of the bearing ball centers. A matching convex surface 76 is formed on the centering washer or disc 68 so that when pressed together the discs 65 and 68 tend to center one another about the same axis. To minimize friction and wear, the confronting and contacting surfaces 73 and 76 are ground and polished, the discs preferably being formed of an alloy steel capable of being surface hardened and of taking a high polish. A lock nut 80 is received on the threaded spindle portion 66 outside the nut disc 65 and when drawn up against the latter secures it against unscrewing. The lock nut 80 may have a cylindrical periphery, turning being effected by a spanner wrench (not shown) the lugs of which are received in a number of axial sockets 81 spaced circumferentially about the nut.

To insure application of the axial loading to the bearing races in a uniform manner, side faces 44 and 54 of the partitions and side faces 64 and 74 of the bearing retainer disc and centering disc respectively are ground and polished, preferably being formed on the end faces of axially directed shallow flange portions of these components. By thus forming the race contacting surface on the end of an integral flange portion which projects axially beyond the main body of the particular component, the grinding and polishing of such end surface is facilitated and proper contact between the finished surface and the appropriate bearing race is assured.

The end openings of the housing through which are projected the tool end 63 and the oppositely directed pulley receiving end 83 of the spindle are closed by suitable dust seal assemblies. The dust seals are similar and comprise flanged cast metal end caps 84 and 94 screwed into threaded counterbores in the ends of the housing 2, these threaded counterbores being of larger diameter than the adjacent counterbores 37 and 47 which receive the bearing assemblies. Rings 82 of suitable deformable sealing material such as cork are interposed between the cap flanges and the housing ends, and the peripheries of the caps are desirably knurled to facilitate assembly and disassembly. The end caps are centrally apertured to accommodate the tool and pulley ends 63 and 83, respectively, of the spindle 1, the caps having running fits with the spindle ends, as indicated at 85 and 95. The inside faces of the end caps are formed with circular coaxial recesses 86 and 96 that receive annular bronze dust caps 87 and 97 with interposed flat annular felt seals 88 and 98.

The cylindrical walls of the end cap recesses 86 and 96 receive the cylindrically surfaced peripheries of the bronze dust seals 87 and 97 with easy fits to prevent binding of the parts in assembly and operation. The inner peripheries of the bronze dust seals have free running fits with the spindle end portions which they surround. The felt washer seals 88 and 98 absorb lubricant migrating along the spindle from the interior of the housing and also prevent the entrance of dirt, water and dust into the bearing chambers.

At their outer peripheries the bronze dust rings 87 and 97 are formed with circular flanges 89 and 99 which project beyond inner end faces 90 and 100 of the end caps 84 and 94, respectively. These axial flanges are directed toward and received in annular channels or grooves 91 and 101 in the outwardly directed flat end faces of the steel bearing retainer 60 (on the tool end of the spindle) and the alloy steel nut disc 65 (on the pulley end of the spindle). In the case of the bronze dust cap 97 the flange 99 defines a circular recess 105 formed in the inner end face of the cap to accommodate the lock nut or ring 80.

The clearances between the parts are such that the inwardly directed end faces of the end and dust caps are spaced from the outwardly directed faces of the bearing retainer 60 and the nut disc 65 in the provision of axially thin chambers 92 and 102 just inside the end and dust caps. Each of these narrow chambers includes an annular tortuous portion or maze located in the channel 91 in the case of the chamber at the tool end of the spindle and in the channel 101 in the case of the chamber at the pulley end of the spindle. The chambers 92 and 102 communicate with the chambers containing the bearing assemblies through the annular clearances 93 and 103 surrounding the bearing retainer 60 at the tool end and surrounding the nut disc 65 and centering washer 68 at the pulley end of the spindle. The bearing assembly chambers are continuous with annular clearances 104 which lie along the inside faces of the bearing retainer 60 and the nut disc 65 and, in turn, are continuous with the annular clearances 93 and 103. There is thus provided at each end of the spindle, outside the bearing assemblies, a narrow tortuous annular passage which extends from the chamber portion containing the bearings around the discs or washers at a diameter greater than that containing the ball bearings 40 and 50. The passage continues axially of the device outside the washers and discs, thence radially inwardly to the spindle at points inside the bronze dust seals. Such arrangement constitutes an effective means for keeping lubricant within the bearing chambers while preventing the entrance of dust and dirt.

The pulley 10 has an axial bore 110 that receives the reduced diameter spindle end 83 in a close sliding fit. It is difficult in commercial practice to obtain a sufficiently close fit of the pulley on the spindle end to eliminate objectionable vibration and chatter at the high speeds for which the present device is intended. To obtain the desired tight fit of the pulley in relation to the spindle and to center the pulley in coaxial relation to the spindle the pulley is located so as to project beyond and overhang end 111 of the spindle. A centering cone 112 is then received within the ends of the pulley bore 110 and an axial bore 114 in the spindle. The cone 112 is forced into centering relation to the parts by a draw bar 115 which extends axially through the spindle bore 114 and at the tool end of the latter is threaded into the base of the tool or tool holder.

In the arrangement shown the tool end of the spindle 1 is formed with a coaxial conical socket 116 continuous with the bore 114 and adapted to receive conical shank 117 of a conventional collet adapter or tool holder 118 carrying a burr 122. The draw bar 115 may extend through an axial bore in the centering cone 112 or, as shown, the centering cone may be integrally formed on the draw bar. At its outer end the draw bar is formed with a square end 119 for turning the draw bar in screwing it into the internally threaded socket provided in the small end of the tool holder shank 117. Such tightening of the draw bar not only holds the centering cone 112 firmly against the spindle end 111 but also draws the tool holder shank 117 snugly into the tapered socket 116, preventing loosening of the latter in operation. The end portions of the pulley and spindle bores 110 and 114 are formed with conical chamfers 120 and 121, respectively. These chamfers are of the same angularity as that of the centering cone 112, providing broad annular surface contacts between the centering cone and both the pulley and the spindle.

In order to center the pulley 10 by means of the cone 112 the pulley is axially loaded relative to the spindle as by a set screw 124 threaded radially through reduced diameter inner end portion 125 of the pulley. The set screw has a conical or tapered working end 126 which engages the wall of a corresponding tapered recess 127 in the spindle. Reaction of the tapered end of the set screw against the tapered wall of the recess tends to force the pulley axially against the centering cone 112, the latter being located axially by engagement against the internal conical surface 121 provided by the chamfered end of the spindle. In this pulley mounting arrangement the pulley is preferably of such length axially along the spindle to space the set screw 124 several spindle diameters from the centering cone, thereby minimizing the effect of clearances on tolerances between the pulley and spindle.

The high speed spindle device of the present invention can be initially assembled with solid lubricant of the bleeding type in the chamber 56 sufficient to last for its normal life or use period. The axial load or slack take up applied to the bearing assemblies by the bearing adjustment disc or loading nut 65 effectively prevents objectionable end play and permits high speed operation without vibration or chatter. Spindle devices of this type are customarily operated at speeds above 10,000 revolutions per minute. They are frequently used at speeds of from 25,000 to 50,000 R. P. M. and in test conditions have been turned at speeds over 80,000 R. P. M. The unique mounting arrangement for the spindle, comprising single tilt bar 3, which permits separate and independent rotative movements about several axes in addition to bodily shifting along the axis of the tilt bar, makes the device adaptable to numerous burring and grinding operations, the device being particularly effective in internal burring. By reason of the simple sleeve mounting of the housing 2 on the tilt bar 3 the housing can, by relaxing the grip of the sleeve, be rotated end for end in orienting or adapting the device to the requirements of different setups. In such end for end reversal of the spindle, the motor 5 is also reversed end for end on the platform 34 of the motor bracket 4.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. In combination in a rotary tool holding device having a housing and a spindle journaled in the housing for high speed rotation, a pulley embracing one end of the spindle, a centering cone disposed at said one end of the spindle, means coacting between the spindle and the cone to draw the latter axially toward the spindle end, the cone being arranged for its conical surface simultaneously to engage both the spindle end and the pulley to center the pulley on the spindle, and means coacting between the spindle and the pulley for applying an axial load on the pulley relative to the spindle to hold the pulley against the centering cone.

2. The rotary tool holding device combination substantially as set forth in claim 1 in which the pulley and the one end of the spindle are formed with conical internal surfaces complemental to the surface of the centering cone.

3. The rotary tool holding device combination substantially as set forth in claim 1 in which a set screw carried by the pulley and a socket in the spindle coact to apply said axial load on the pulley.

4. A high speed rotary tool holding device comprising a housing having openings in opposite ends, a spindle extending through the housing, a pair of bearing assemblies mounted in the housing and spaced axially along the spindle, each bearing assembly comprising inner and outer annular races and rolling elements between the races, the outer races being held by the housing against movement toward one another, the inner races being received snugly about spaced portions of the spindle to support the latter for rotation about an axis extending through the housing end openings, means limiting axial movement of the inner race of one of the bearing assemblies along the spindle, a first disc abutting the inner race of the other bearing assembly and having a close fit with the spindle, a second disc abutting the first disc, the spindle being externally threaded adjacent said other bearing assembly and the second disc being formed with corresponding internal threads whereby an axial force can be applied to the inner race of the said other bearing assembly by screwing the second disc against the intervening first disc, said discs having arcuately curved faces contacting one another and a lock nut on the spindle threads to hold the threaded disc against unscrewing.

5. A high speed rotary tool holding device comprising a housing having openings in opposite ends, a spindle extending through the housing, a pair of bearing assemblies mounted in the housing and spaced axially along the spindle, each bearing assembly comprising inner and outer annular races and rolling elements between the races, the outer races being held by the housing against movement toward one another, the inner races being received snugly about spaced portions of the spindle to support the latter for rotation about an axis extending through the housing end openings, means limiting axial movement of the inner race of one of the bearing assemblies along the spindle, a first disc abutting the inner race of the other bearing assembly and having a close fit with the spindle, a second disc abutting the first disc, said discs having arcuately curved surfaces contacting one another, the curved faces of the discs generating a torus, the spindle being externally threaded adjacent said other bearing assembly and the second disc being formed ith corresponding internal threads whereby an axial force can be applied to the inner race of the said other bearing assembly by screwing the second disc against the intervening first disc, and a lock nut on the spindle threads to hold the threaded disc against unscrewing.

6. A high speed rotary tool holding device comprising a housing having openings in opposite ends, a spindle extending through the housing, a pair of bearing assemblies mounted in the housing and spaced axially along the spindle, each bearing assembly comprising inner and outer annular races and rolling elements between the races, the spindle being separated from the housing by an annular clearance space, circular discs carried by the spindle adjacent and on the outside of each bearing assembly, the peripheries of the disc each extending radially beyond the rolling elements of the adjacent bearing assembly and having a running fit with the housing, partition means carried by the housing and defining a lubricant chamber located in the annular clearace space and between the bearing assemblies, said partition means having a close running fit with the spindle to permit escape of thin liquid lubricant from the chamber along the spindle to the bearing assemblies, said housing being formed with an internal shoulder at one end of the lubricant chamber, the partition means comprises a disc having a circular periphery disposed between the housing shoulder and the outer race of one of the bearing assemblies, and the said one bearing assembly being under axial load to clamp the partition disc periphery between its outer race and the housing, and dust seal means carried by the housing and having a running fit with the spindle outwardly of the discs.

7. A high speed rotary tool holding device comprising a housing having openings in opposite ends, a spindle extending through the housing, a pair of bearing assemblies mounted in the housing and spaced axially along the spindle, each bearing assembly comprising inner and outer annular races and rolling elements between the races, the spindle being separated from the housing by an annular clearance space, circular discs carried by the spindle adjacent and on the outside of each bearing assembly, the peripheries of the discs each extending radially beyond the rolling elements of the adjacent bearing assembly and having a running fit with the housing, partition means carried by the housing and defining a lubricant chamber located in the annular clearance space and between the bearing assemblies, said partition means having a close running fit with the spindle to permit escape of thin liquid lubricant from the chamber along the spindle to the bearing assemblies, said housing being formed with internal shoulders at the ends of the lubricant chamber, the partition means comprises circular discs, said partition discs being disposed between the housing shoulders and the outer races of the bearing assemblies, the spindle being formed with a shoulder adjacent one of the bearing assemblies, the outside disc adjacent said one bearing assembly being disposed between the spindle shoulder and the inner race of such one bearing assembly, the other outside disc being disposed against the inner race of the other bearing assembly, and means for applying an axial load reaction between the last mentioned disc and the spindle whereby each bearing assembly is loaded axially by reaction of the outer race against one of the partition discs and the inner race against one of the outside discs, and dust seal means carried by the housing and having running fits with the spindle outwardly of the discs.

8. A high speed rotary tool holding device comprising a housing having openings in opposite ends, a spindle extending through the housing, a pair of bearing assemblies mounted in the housing and spaced axially along the spindle, at least one of the bearing assemblies comprising inner and outer annular races and rolling elements between the races, the spindle being separated from the housing by an annular clearance space, a circular disc carried by the spindle adjacent and on the outside of said one bearing assembly, the periphery of the disc extending radially beyond the rolling elements of the adjacent bearing assembly and having a running fit with the housing, and partition means carried by the housing and defining a lubricant chamber located in the annular clearance space and between the bearing assemblies, said partition means having a close running fit with the spindle to permit escape of thin liquid lubricant from the chamber along the spindle to the bearing assemblies, said housing being formed with an internal shoulder at one end of the lubricant chamber, the partition means comprising a disc having a circular periphery disposed between the housing shoulder and the outer race of said one bearing assembly, and the said one bearing assembly being under axial load to clamp the partition disc periphery between its outer race and the housing.

9. A high speed rotary tool holding device comprising a housing having openings in opposite ends, a spindle extending through the housing, a pair of bearing assemblies mounted in the housing and spaced axially along the spindle, each bearing assembly comprising inner and outer annular races and rolling elements between the races, the spindle being separated from the housing by an annular clearance space, circular discs carried by the spindle adjacent and on the outside of each bearing assembly, the peripheries of the discs each extending radially beyond the rolling elements of the adjacent bearing assembly and having a running fit with the housing, and partition means carried by the housing and defining a lubricant chamber located in the annular clearance space and between the bearing assemblies, said partition means having a close running fit with the spindle to permit escape of thin liquid lubricant from the chamber along the spindle to the bearing assemblies, said housing being formed with an internal shoulder at one end of the lubricant chamber, the partition means comprises a disc having a circular periphery disposed between the housing shoulder and the outer race of one of the bearing assemblies, and the said one bearing assembly being under axial load to clamp the partition disc periphery between its outer race and the housing.

10. A high speed rotary tool holding device comprising a housing having openings in opposite ends, a spindle extending through the housing, a pair of bearing assemblies mounted in the housing and spaced axially along the spindle, each bearing assembly comprising inner and outer annular races and rolling elements between the races, the spindle being separated from the housing by an annular clearance space, circular discs carried by the spindle adjacent and on the outside of each bearing assembly, the peripheries of the discs each extending radially beyond the rolling elements of the adjacent bearing assembly and having a running fit with the housing, and partition means carried by the housing and defining a lubricant chamber located in the annular clearance space and between the bearing assemblies, said partition means having a close running fit with the spindle to permit escape of thin liquid lubricant from the chamber along the spindle to the bearing assemblies, said housing being formed with internal shoulders at the ends of the lubricant chamber, the partition means comprises circular discs, said partition discs being disposed between the housing shoulders and the outer races of the bearing assemblies, the spindle being formed with a shoulder adjacent one of the bearing assemblies, the outside disc adjacent said one bearing assembly being disposed between the spindle shoulder and the inner race of such one bearing assembly, the other outside disc being disposed against the inner race of the other bearing assembly, and means for applying an axial load reaction between the last mentioned disc and the spindle whereby each bearing assembly is loaded axially by reaction of the outer race against one of the partition discs and the inner race against one of the outside discs.

11. A high speed rotary tool holding device comprising a supporting body, a shouldered spindle, a pair of bearing assemblies carried by the supporting body and spaced axially along the spindle, each bearing assembly comprising inner and outer annular races and rolling elements between the races, the outer races being held by the body against movement toward one another, the inner races being received snugly about spaced portions of the spindle to support the latter for rotation, means limiting axial movement of the inner race of one of the bearing assemblies along the spindle, a first disc abutting the inner race of the other bearing assembly and having a close fit with the spindle, and a second disc abutting the first disc, the spindle being externally threaded adjacent said other bearing assembly and the second disc being formed with corresponding internal threads whereby an axial force can be applied to the inner face of the said other bearing assembly by screwing the second disc against the intervening first disc, said discs having arcuately curved faces contacting one another.

12. A high speed rotary tool holding device comprising a supporting body, a shouldered spindle, a pair of bearing assemblies carried by the supporting body and spaced axially along the spindle, at least one bearing assembly comprising inner and outer annular races and rolling elements between the races, means to prevent movement of the outer race toward the other bearing assembly, the inner race of the one bearing and the other bearing assembly being received snugly about spaced portions of the spindle to support the latter for rotation, a first disc abutting the inner race and having a close fit with the spindle, and a second disc abutting the first disc, the spindle being externally threaded adjacent the one bearing assembly and the second disc being formed with corresponding internal threads whereby an axial force can be applied to the inner race by screwing the second disc against the intervening first disc, said discs having arcuately curved faces contacting one another.

13. A high speed rotary tool holding device comprising a supporting body, a shouldered spindle, a pair of bearing assemblies carried by the supporting body and spaced axially along the spindle, each bearing assembly comprising inner and outer annular races and rolling elements between the races, the outer races being held by the body against movement toward one another, the inner races being received snugly about spaced portions of the spindle to support the latter for rotation, means limiting axial movement of the inner race of one of the bearing assemblies along the spindle, a first disc abutting the inner race of the other bearing assembly and having a close fit with the spindle, and a second disc abutting the first disc, the spindle being externally threaded adjacent said other bearing assembly and the second disc being formed with corresponding internal threads whereby an axial force can be applied to the inner race of the said other bearing assembly by screwing the second disc against the intervening first disc, said discs having arcuately curved faces contacting one another, said arcuately curved faces generating a torus.

14. A high speed rotary tool holding device comprising a supporting body, a shouldered spindle, a pair of bearing assemblies carried by the supporting body and spaced axially along the spindle, at least one bearing assembly comprising inner and outer annular races and rolling elements between the races, means to prevent movement of the outer race toward the other bearing assembly, the inner race of the one bearing and the other bearing assembly being received snugly about spaced portions of the spindle to support the latter for rotation, a first disc abutting the inner race and having a close fit with the spindle, and a second disc abutting the first disc, the spindle being externally threaded adjacent the one bearing assembly and the second disc being formed with corresponding internal threads whereby an axial force can be applied to the inner race by screwing the second disc against the intervening first disc, said discs having arcuately curved faces contacting one another, said arcuately curved faces generating a torus.

15. A high speed rotary tool holding device comprising a tubular supporting body open at opposite ends, a spindle extending through the body and projecting out the end openings, the spindle being separated from the body by an annular clearance space, a pair of bearing assemblies spaced axially along the spindle and supporting the latter in the body, each bearing assembly comprising inner and outer annular races and rolling elements between the races, the body end openings being counterbored providing cylindrical end chambers receiving the outer races of the bearing assemblies and also providing circumferentially extending axially spaced and oppositely directed shoulders engageable with such outer races, the inner races being received snugly about the spindle, abutment means on the spindle to locate and receive the axial thrust of the inner race of one of the bearing assemblies, means for loading the inner race of the other bearing assembly of the pair, said loading means comprising first and second centrally apertured discs received over the spindle, the discs having circular inner and outer peripheries, the first disc being located intermediate the second disc and said last mentioned inner race, the spindle and the second disc being formed with interfitting threads for shifting the second disc axially in applying load to the bearing assemblies, each of said discs being relatively thin and having a radial dimension between inner and outer peripheries several times its axial thickness, and the diameter of the outer periphery of at least one of the discs being greater than that of the cylindrical surface generated by the outermost portions of the rolling elements of such other of the bearing assemblies.

16. A high speed rotary tool holding device comprising a tubular supporting body open at opposite ends, a spindle extending through the body and projecting out the end openings, the spindle being separated from the body by an annular clearance space, a pair of bearing assemblies spaced axially along the spindle and supporting the latter in the body, each bearing assembly comprising inner and outer annular races and rolling elements between the races, the body end openings being counterbored providing cylindrical end chambers receiving the outer races of the bearing assemblies and also providing circumferentially extending axially spaced and oppositely directed shoulders engageable with such outer races, the inner races being received snugly about the spindle, abutment means on the spindle to locate and receive the axial thrust of the inner race of one of the bearing assemblies, means for loading the inner race of the other bearing assembly of the pair, said loading means comprising first and second centrally apertured discs received over the spindle, the discs having circular inner and outer peripheries, the first disc being located intermediate the second disc and said last mentioned inner race, the spindle and the second disc being formed with interfitting threads for shifting the second disc axially in applying load to the bearing assemblies, each of said discs being relatively thin and having a radial dimension between inner and outer peripheries several times its axial thickness, the diameter of the outer periphery of the second disc being greater than that of the cylindrical surface generated by the outermost portions of the rolling elements of such other of the bearing assemblies, said second disc having an annular groove concentric to the rotational axis of the spindle, an annular sealing element carried by the tubular body and surrounding the spindle adjacent said other of the bearing assemblies, and said sealing element having a circular flange projecting into the annular disc groove.

17. A high speed rotary tool holding device comprising a tubular housing body having openings in opposite ends, a spindle extending through the housing body, a pair of bearing assemblies mounted in the housing body and spaced axially along the spindle, each bearing assembly comprising inner and outer annular races and rolling elements between the races, the spindle being separated from the housing by an annular clearance space, partition elements carried by the housing body and having circular outer peripheries sealingly clamped between the outer races of the bearing assemblies and the housing body, said partition elements projecting radially into the annular clearance space, said partition elements being axially spaced along the spindle and having close running fits with the latter to delineate the ends of a central lubricant chamber portion of the annular clearance space, the bearing assemblies each being outside the lubricant chamber portion to receive lubricant migrating axially along the spindle from the central chamber through the running fits between the spindle and the partition elements, circular discs mounted on the spindle outwardly of the bearing assemblies and adjacent the latter, the discs and the partition elements delineating the ends of bearing chamber portions of the annular clearance space, and the peripheries of the discs each extending radially beyond the cylindrical surface generated by the outermost portions of the rolling elements of the adjacent bearing assembly and having running fits with the housing body.

18. A high speed rotary tool holding device comprising a tubular housing body having openings in opposite ends, a spindle extending through the housing body, a pair of bearing assemblies mounted in the housing body and spaced axially along the spindle, each bearing assembly comprising inner and outer annular races and rolling elements between the races, the spindle being separated from the housing by an annular clearance space, partition elements carried by the housing body and having circular outer peripheries sealingly clamped between the outer races of the bearing assemblies and the housing body, said partition elements projecting radially into the annular clearance space, said partition elements being axially spaced along the spindle and having close running fits with the latter to delineate the ends of a central lubricant chamber portion of the annular clearance space, the bearing assemblies each being outside the lubricant chamber portion to receive lubricant migrating axially along the spindle from the central chamber through the running fits between the spindle and the partition elements, circular discs mounted on the spindle outwardly of the bearing assemblies and adjacent the latter, the discs and the partition elements delineating the ends of bearing chamber portions of the annular clearance space, the peripheries of the discs each extending radially beyond the cylindrical surface generated by the outermost portions of the rolling elements of the adjacent bearing assembly and having running fits with the housing body, one of the discs being formed with an annular groove concentric to the rotational axis of the spindle, an annular sealing element carried by the housing body and surrounding the spindle adjacent said one disc, and said sealing element having a circular flange projecting into the annular disc groove.

19. A high speed rotary tool holding device comprising a tubular supporting body open at opposite ends, a spindle extending through the body and projecting out the end openings, the spindle being separated from the body by an annular clearance space, a pair of bearing assemblies spaced axially along the spindle and supporting the latter in the body, each bearing assembly comprising inner and outer annular races and rolling elements between the races, means for applying an axial load to the bearing assemblies to eliminate end play in the spindle relative to the body, said loading means including a centrally apertured disc member having circular inner and outer peripheries, the disc being received over the spindle and disposed to bear against one of the inner races, a cap carried by the body across one of the end openings and having a central opening through which the spindle projects, said cap being formed with a cylindrical recess concentric to the rotational axis of the spindle, an annular sealing member slidingly supported in the recess of the cap for relative axial movement, and one of the members being formed with an axially projecting annular flange and the other of the members having an annular groove complemental to the annular flange to receive the edge of the latter in a running fit.

20. The device of claim 19 in which an annular deformable packing ring is disposed between the sealing member and the bottom of the recess in the cap, said packing ring having its outer periphery confined by the walls of the cap recess and its inner periphery closely embracing the spindle.

References Cited in the file of this patent

UNITED STATES PATENTS

| | | |
|---|---|---|
| 811,339 | Tucker | Jan. 30, 1906 |
| 852,021 | Grosvenor et al. | Apr. 30, 1907 |
| 1,479,205 | Parker | Jan. 1, 1924 |
| 1,697,046 | Chapman et al. | Jan. 1, 1929 |
| 2,000,581 | Coffin et al. | May 17, 1935 |
| 2,174,146 | Turrettini | Sept. 26, 1939 |
| 2,232,159 | Blood | Feb. 18, 1941 |
| 2,239,639 | Amidon | Apr. 22, 1941 |
| 2,447,618 | Nicholson | Aug. 24, 1948 |
| 2,507,677 | Packer et al | May 16, 1950 |
| 2,511,675 | Monpain | June 13, 1950 |
| 2,612,009 | Tavano | Sept. 30, 1952 |
| 2,653,538 | Peyrebrune | Sept. 29, 1953 |

UNITED STATES PATENT OFFICE

CERTIFICATE OF CORRECTION

Patent No. 2,809,475                                         October 15, 1957

Horace P. Smith

It is hereby certified that error appears in the printed specification of the above numbered patent requiring correction and that the said Letters Patent should read as corrected below.

Column 1, line 18, after "rotary" insert -- tool --; column 9, line 27, for "ith" read -- with --; line 42, for "disc" read -- discs --; line 46, for "clearace" read -- clearance --.

Signed and sealed this 3rd day of June 1958.

(SEAL)

Attest:

KARL H. AXLINE

Attesting Officer

ROBERT C. WATSON
Commissioner of Patents